Figure 2:
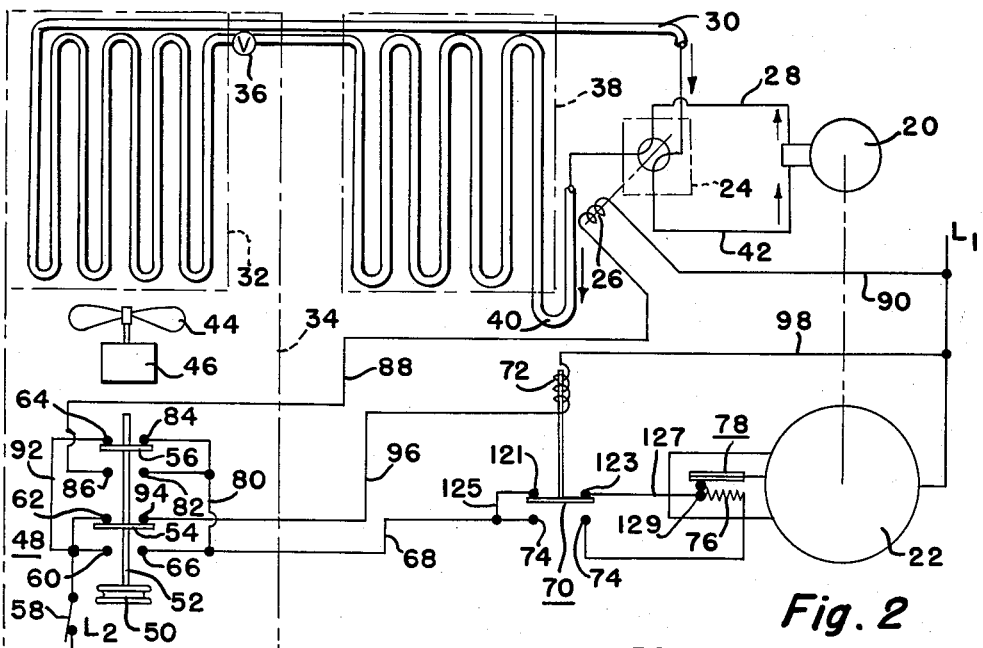

Dec. 20, 1960   J. A. CANTER   2,964,922
REFRIGERATING APPARATUS
Filed March 23, 1959

INVENTOR.
James A. Canter
BY Edwin S. Dybvig
His Attorney

United States Patent Office 2,964,922
Patented Dec. 20, 1960

2,964,922

REFRIGERATING APPARATUS

James A. Canter, Dayton, Ohio, assignor to General Motors Corporation, Detroit, Mich., a corporation of Delaware Filed Mar. 23, 1959, Ser. No. 801,379

9 Claims. (Cl. 62—160)

This invention pertains to refrigerating apparatus and especially to motor protectors for reversible refrigerating systems for air conditioning.

Reversible refrigerating systems, commonly called heat pumps, have become increasingly popular as a means for providing heat in cold weather and cooling in warm weather. The motor in such systems is commonly protected by automatically resetting thermal overload protectors responsive to the motor current or motor heat or a combination of the two. Often the motor load during the heating period is greater than during the cooling period. It has also been found that such protectors trip less readily during the heating periods than during the cooling periods. One of the reasons for this is that the ambient motor and motor protector are cooler during the heating period than during the cooling period.

It is an object of this invention to provide an arrangement for tripping the thermal overload protector as readily during the heating period as during the cooling period.

It is another object of this invention to increase the speed of tripping of the thermal overload protector during the heating period.

It is a further object of this invention to add heat proportional to the motor current to a thermal overload protector during the heating period sufficient to compensate for the cooler environment.

These and other objects are attained in the form shown in the drawings in which the double pole, double throw thermostat controls both the heating and the cooling operations and in which one of each alternate set of contacts controls the motor-compressor unit for either heating or cooling while one of the additional contacts is effective during the heating period for energizing the reversing valve to cause the refrigerating system to heat while during the cooling period the additional set of contacts is used to energize a solenoid switch to disconnect the booster heater for the thermal overload protector which was connected in series with the protector during the heating period.

Further objects and advantages of the present invention will be apparent from the following description, reference being had to the accompanying drawings wherein a preferred embodiment of the present invention is clearly shown.

Figure 1:
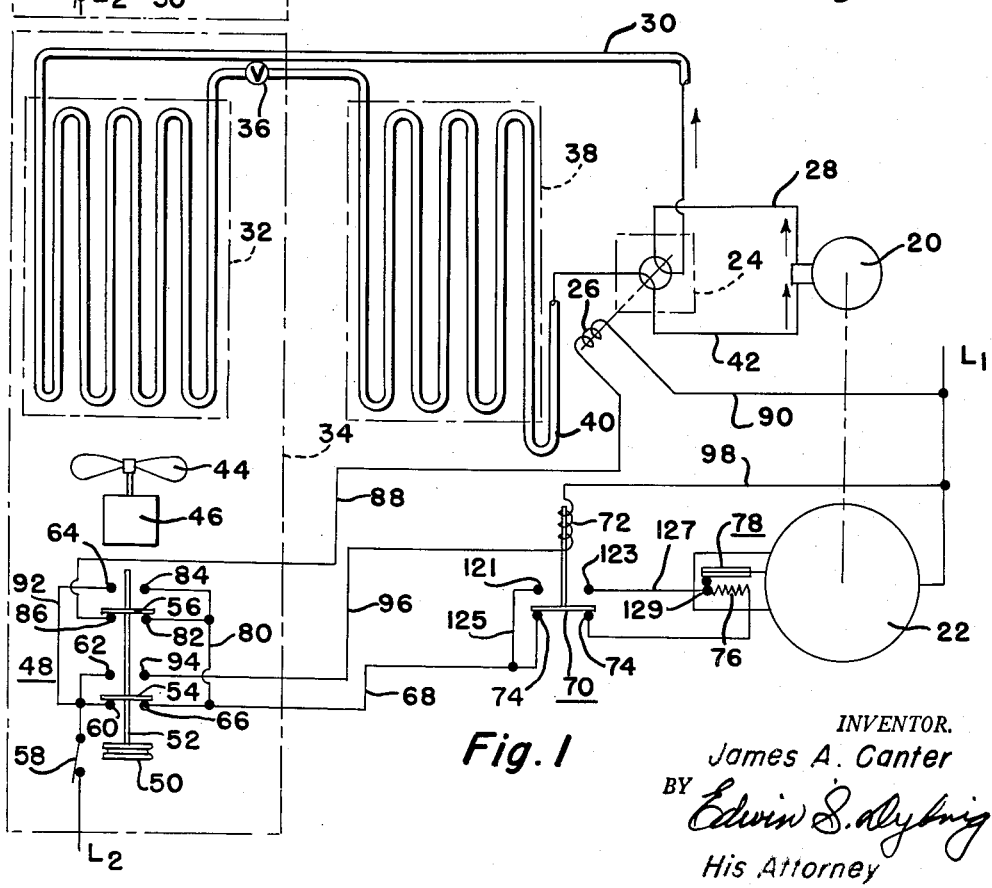

In the drawings:

Figure 1 is a diagrammatic view of a reversible refrigerating system embodying my invention shown in the heating cycle arrangement; and Figure 2 is a similar diagrammatic view showing the system as in the cooling cycle.

Referring now to the drawings, there is shown diagrammatically a refrigerant compressor 20 driven by an electric motor 22. The outlet and inlet of the compressor 20 are connected to a solenoid operated reversing valve 24 having a solenoid actuator 26. The reversing valve 24 may, for example, be a Ranco V26 valve. During the heating cycle, the reversing valve 24 is energized and connects the outlet of the compressor 20 and the outlet passage 28 to the conduit 30 connecting with the indoor heat transfer unit 32 located in a room or space 34 to be conditioned. The hot refrigerant discharged from the compressor 20 gives off heat in the heat transfer unit 32 which during the heating cycle becomes a condenser and the dissipation of the heat to the room is accomplished by condensation of the refrigerant. The condensed refrigerant then flows through a flow control device 36, such as a restrictor or expansion valve, to the second or outdoor heat transfer unit 38 preferably located outside the room 34. The liquid refrigerant evaporates in the second unit 38 and is conducted through the conduit 40 to the reversing valve 24 which connects with the suction conduit 42 extending to the inlet of the compressor 20. Air from the room or enclosure 34 is circulated over the first unit 32 by the fan 44 driven by an electric motor 46. This air returns to the room 34 and heats it.

The system is controlled primarily by a double pole, double throw thermostat 48 which may be a Ranco C22 stage thermostat. This thermostat 48 includes a thermostatic actuator 50 responsive to the temperature of the air in the room 34. The actuator is connected by a follower 52 to a first double throw contact 54 and a second double throw contact 56. Supply conductor L2 connects through a manual switch 58 with the contacts 60, 62 and 64. In the cold position, the contact 54 bridges the contacts 60 and 66 to provide a connection from line L2 through a conductor 68 to a double throw solenoid switch 70 operated by a solenoid 72. The switch 70 has a lower set of contacts 74 which are bridged when the solenoid 72 is deenergized to connect the conductor 68 with an external heater 76 thermally associated with the thermal overload protector 78 which may be mounted in heat transfer association with the motor 22. The motor 22 and the compressor 20 may be combined in a sealed unit.

The protector 78 preferably has a bimetal actuator which is self-heated by the current flowing through it and is connected directly in series with the motor 22. If desired, the overload protector 78 may have additional external heating by an additional heater connected in series with it. The opposite side of the motor 22 is connected to the supply conductor L1. The switch 48 has a conductor 80 connecting the conductor 68 with the contacts 82 and 84. In the heating position, the double throw contact 56 bridges the contacts 82 and 86 to provide a connection from the conductor 80 to the conductor 88 which connects to the solenoid 26 of the reversing valve 24. The opposite terminal of the solenoid 26 is connected by the conductor 90 to the supply conductor L1.

During the period when the room 34 requires heat, the temperature outside the room 34 is naturally colder than the room 34 so that the portion of the refrigerating system and its controls which are outside the room 34 are subject to a colder environment. This colder environment effects the rate of tripping and slows the rate of tripping of the thermal motor protector 78. The sealed unit 22, although it may operate at greater loads during the heating period, is likewise subject to the colder environment; and its outer shell will normally be colder than at other times. Under such circumstances, the motor 22 might otherwise be overloaded sufficiently to damage it without the protector 78 being tripped. However, according to the present invention, the difference in environment during the heating period is compensated by the booster heater 76 which is connected in series with the contacts of the protector 78 during the heating period by the switch 70.

When the outdoor temperatures become warmer than the temperatures within the room 34, there will first be a period during which no cooling of the room 34 will be required. During this period the thermostatic actuator 50 will hold the contacts 54 and 56 in an intermediate position, thus deenergizing the entire system. As the room 34 becomes warmer, the contact 56 will bridge the contacts 64 and 84 to connect the line L2 through the switch 58 and the conductor 92 with the conductor 80 and the conductor 68 to reenergize the electric motor 22. At the same time, the bridging contact 54 will connect the contact 62 with a contact 94 connected by a conductor 96 to the solenoid 72 which in turn is connected by a conductor 98 to the line L1. This energization of the solenoid 72 will operate the switch 70 to cause its bridging contact to connect the contacts 121 and 123. The contact 121 is connected by the conductor 125 to the conductor 68 while the contact 123 is connected by the conductor 127 to the stationary contact 129 of the motor protector 78. This energized position of the switch 70 shunts out the heater 76 to compensate for the warmer environment.

During the cooling period, the reversing valve 24 has moved during deenergization of the solenoid 26 and the system to the opposite position shown in Figure 2 in which the discharge of the compressor is now connected to the second heat transfer unit 38 which becomes the condenser and condenses the refrigerant which is forwarded under the control of the valve 36 to the first unit 32 where the liquid refrigerant evaporates to cool the air circulated to and from the room by the fan 44. The valve 24 returns the evaporated refrigerant from the conduit 30 to the suction inlet of the compressor 20. The motor 22 during the cooling period therefore does not have its capacity reduced by the heater 76 so that it is able to perform its full load in the warmer environment since the heater 76 is deenergized. Through this arrangement, the motor protector 78 is properly compensated for the difference in the environment during the heating and cooling cycles.

While the embodiment of the present invention as herein disclosed, constitutes a preferred, it is to be understood that other forms might be adopted.

What is claimed is as follows:

1. In a reversible refrigerating system for heating and cooling air including a first heat transfer unit and a second heat transfer unit and a flow control connected between the units and an electric motor and a compressor driven by the electric motor for withdrawing evaporated refrigerant from one of the units and forwarding compressed refrigerant to the other unit, an electrically operated reversing means for arranging said system to either cool or heat the air, a thermostatic switch means responsive to the temperature of the air having a cool position for energizing said electric motor and said reversing means to operate said refrigerating system in the reversing arrangement to heat the air and having a warm position for energizing said electric motor and deenergizing said reversing means to operate said refrigerating system in the cooling arrangement to cool the air, a thermal overload protector for said electric motor, an electric heater associated in heat transfer relation with said protector, and means effective only in the cool position of said thermostatic switch means for energizing said electric heater for heating said protector to compensate for the cool environment temperature upon an overload and effective in said warm position for deenergizing said electric heater.

2. A reversible refrigerating system for heating and cooling air including a first heat transfer unit associated with the air to be heated and cooled, a second heat transfer unit thermally isolated from said first unit and said air to be heated and cooled, a flow control connecting said units, an electric motor and a compressor driven by the electric motor for withdrawing evaporated refrigerant from one of the units and for forwarding compressed refrigerant to the other unit, an electrically operable reversing valve connected between said compressor and said units for selecting said units alternately for heating or cooling, a thermal overload protector means connected in series circuit with said electric motor, an electric heater associated with said protector means, and a double throw switch means having one position for energizing said motor and said reversing valve and said heater and a second position for energizing only said motor and deenergizing said reversing valve and said heater.

3. A reversible refrigerating system for heating and cooling air including a first heat transfer unit associated with the air to be heated and cooled, a second heat transfer unit thermally isolated from said first unit and said air to be heated and cooled, a flow control connecting said units, an electric motor and a compressor driven by the electric motor for withdrawing evaporated refrigerants from one of the units and for forwarding compressed refrigerant to the other unit, an electrically operable reversing valve connected between said compressor and said units for selecting said units alternately for heating or cooling, a thermal overload protector means connected in series circuit with said electric motor, an electric heater associated with said protector means, a double throw electrically operated switch having a deenergized position connecting to said heater and protector and motor and an energized position connecting to said protector and motor and deenergizing said heater and a double throw switch means having one position for energizing said motor and said reversing valve and deenergizing said electrically operated switch for energizing only said motor and said switch and deenergizing said valve.

4. A reversible refrigerating system for heating and cooling air including a first heat transfer unit associated with the air to be heated and cooled, a second heat transfer unit thermally isolated from said first unit and said air to be heated and cooled, a flow control connecting said units, an electric motor and a compressor driven by the electric motor for withdrawing evaporated refrigerants from one of the units and for forwarding compressed refrigerant to the other unit, an electrically operable reversing valve connected between said compressor and said units for selecting said units alternately for heating or cooling, a thermal overload protector means connected in series circuit with said electric motor, an electric heater associated with said protector means, and a double pole double throw switch means having two contacts for controlling said protector and motor and a third contact for controlling said reversing valve and a fourth contact for controlling said heater.

5. A reversible refrigerating system for heating and cooling air including a first heat transfer unit associated with the air to be heated and cooled, a second heat transfer unit thermally isolated from said first unit and said air to be heated and cooled, a flow control connecting said units, an electric motor and a compressor driven by the electric motor for withdrawing evaporated refrigerants from one of the units and for forwarding compressed refrigerant to the other unit, an electrically operable reversing valve connected between said compressor and said units for selecting said units alternately for heating or cooling, a thermal overload protector means connected in series circuit with said electric motor, an electric heater associated with said protector means, and a double pole double throw switch means having one contact in each alternate position for energizing said motor and protector and one contact in one alternate position for energizing said reversing valve and one contact in the other alternate position for energizing said heater.

6. A reversible refrigerating system for heating and cooling air including a first heat transfer unit associated with the air to be heated and cooled, a second heat transfer unit thermally isolated from said first unit and said air to be heated and cooled, a flow control connecting said units, an electric motor and a compressor driven by the electric motor for withdrawing evaporated refrigerants from one of the units and for forwarding compressed refrigerant to the other unit, an electrically operable reversing valve connected between said compressor and said units for selecting said units alternately for heating or cooling, a thermal overload protector means connected in series circuit with said electric motor, an electric heater associated with said protector means, an electrically operated double throw switch having one contact connecting said heater in series with said protector and motor and having a second contact connecting with said protector and motor and disconnecting said heater, and a double pole double throw switch means having one contact in each alternate position connecting with said double throw switch and having the second contact in one alternate position connecting with said reversing valve and the second contact in the other alternate position connecting with the electrical operator of said electrically operated switch.

7. In a refrigerating system for changing the temperature of a medium including a first heat transfer unit and a second heat transfer unit and a flow control connected between the units and an electric motor and a compressor driven by the electric motor for withdrawing evaporated refrigerant from one of the units and for forwarding compressed refrigerant to the other unit, a thermostatic switch means responsive to the temperature of the medium having a cool position and a warm position for controlling the energizing of said electric motor and said refrigerating system, a thermal overload protector for said electric motor, an electric heater associated in heat transfer relation with said protector, and means for energizing said heater in the cool position of said thermostatic switch means for heating said protector to compensate for the environment temperature upon an overload and for deenergizing said electric heater in the warm position of said thermostatic switch means.

8. A refrigerating system including a first heat transfer unit, a second heat transfer unit thermally isolated from said first unit, a flow control connecting said units, an electric motor and a compressor driven by the electric motor for withdrawing the evaporated refrigerant from one of the units and for forwarding compressed refrigerant to the other unit, a thermal overload protector connected in series circuit with said electric motor, an electric heater associated with said protector means, and a double throw switch means having one position for energizing said motor and said heater and a second position for energizing said motor and deenergizing said heater.

9. A refrigerating system including a first heat transfer unit, a second heat transfer unit thermally isolated from said first unit, a flow control connecting said units, an electric motor and a compressor driven by the electric motor for withdrawing evaporated refrigerant from one of the units and for forwarding compressed refrigerant to the other unit, a thermal overload protector for said electric motor, an electric heater associated with said protector, and a thermostatic control having a cool position for energizing said heater and a warm position for deenergizing said heater.

References Cited in the file of this patent
UNITED STATES PATENTS

| | | |
|---|---|---|
| 2,200,477 | Newton | May 14, 1940 |
| 2,389,073 | Newton | Nov. 13, 1945 |
| 2,771,748 | Prosek | Nov. 27, 1956 |